United States Patent [19]
Sakamoto et al.

[11] Patent Number: 6,111,035
[45] Date of Patent: Aug. 29, 2000

[54] POLYMERIZATION PROCESS USING SEPARATED FLOW

[75] Inventors: Akihiro Sakamoto, Kuga-gun; Shunyou Uesugi, Tokyo, both of Japan

[73] Assignee: Mitsui Chemicals, Inc., Tokyo, Japan

[21] Appl. No.: 08/993,525

[22] Filed: Dec. 18, 1997

[30] Foreign Application Priority Data

Dec. 26, 1996 [JP] Japan .................................. 8-348195
Sep. 22, 1997 [JP] Japan .................................. 9-257036

[51] Int. Cl.$^7$ ................................ C08F 2/00; C08F 4/44; C08F 4/06
[52] U.S. Cl. ........................ 526/64; 526/88; 526/131; 526/128
[58] Field of Search .................. 526/64, 65, 88, 526/348, 348.6, 237, 131, 128, 901–5; 528/233, 237

[56] References Cited

U.S. PATENT DOCUMENTS

| | | |
|---|---|---|
| 4,089,888 | 5/1978 | Tokumitsu et al. . |
| 4,133,944 | 1/1979 | Cooper et al. ............................ 526/65 |
| 4,168,356 | 9/1979 | Levresse et al. ......................... 526/64 |
| 4,352,923 | 10/1982 | Kono et al. . |
| 4,472,558 | 9/1984 | Casper et al. ............................ 526/64 |
| 5,241,023 | 8/1993 | Brule et al. .............................. 526/70 |
| 5,243,005 | 9/1993 | Hayashi et al. ......................... 526/281 |
| 5,589,555 | 12/1996 | Zboril et al. ............................. 526/64 |
| 5,644,007 | 7/1997 | Davidson et al. . |
| 5,859,157 | 1/1999 | Gupte et al. ............................. 526/88 |

FOREIGN PATENT DOCUMENTS

15 51857   1/1969   France .

Primary Examiner—David W. Wu
Assistant Examiner—Tatyana Zalukaeva
Attorney, Agent, or Firm—Birch, Stewart, Kolasch & Birch, LLP

[57] ABSTRACT

Disclosed is a polymerization process comprising feeding a monomer as a raw material, a polymerization catalyst, and optionally, an inert medium to a tubular reactor in a pressurized state; permitting a part of the raw material monomer and the inert medium fed to the reactor to form a gas phase and the remainder to form a liquid phase, so that both of the gas phase comprising the raw material monomer and/or the inert medium and the liquid phase comprising the raw material monomer and/or the inert medium are present in the reactor, wherein said liquid phase may contain a resulting polymer as a solid, and so that a gas-liquid separated flow or a gas-liquid-solid separated flow has the gas phase that is continuous in the direction of flow is formed in the reactor; and polymerizing the raw material monomer while carrying the liquid phase by the gas phase flow, wherein the ratio of a volume flow rate of the liquid phase to a volume flow rate of the gas phase at the outlet of the reactor is 0.00001 to 100,000. According to the polymerization process, polymerization can be accomplished with excellent thermal efficiency and small power energy, and besides various polymers almost free from restrictions on their properties such as viscosities and melting points can be produced.

6 Claims, 2 Drawing Sheets

POLYMERIZATION PROCESS USING SEPARATED FLOW

FIELD OF THE INVENTION

The present invention relates to a polymerization process using a separated flow, in which a monomer as a raw material is polymerized in a tubular reactor while a gas-liquid separated flow or a gas-liquid-solid separated flow is formed in the reactor.

BACKGROUND OF THE INVENTION

Various reactors, such as a vessel type reactor, a tubular reactor, a tower type reactor, a fluidized bed type reactor and a special reactor, are generally known as reaction apparatuses.

These reactors are properly selected according to the type of reaction, properties of the desired products, etc. For example, if the aimed reaction is a polymerization reaction, a vessel type reactor or a fluidized bed type reactor is usually used as the polymerization reactor.

When the vessel type reactor is used as the polymerization reactor, liquid phase polymerization using a solvent, such as solution (homogeneous) polymerization or slurry polymerization, is generally carried out. The liquid phase polymerization is advantageous in that polymers of relatively high qualities can be obtained and there are few restrictions on the properties of the resulting polymers and the operating conditions.

In the liquid phase polymerization using the vessel type reactor, however, the resulting polymer is dissolved or suspended in a polymerization solvent while stirring to form a polymer liquid (polymer solution or suspension), such that with an increase of in the viscosity of the polymer liquid, the power requirement are increased for stirring the polymer liquid. Especially in the industrial production of high-viscosity polymer liquids, huge stirring equipment is necessary and the stirring energy tends to become enormous.

In the liquid phase polymerization, further, the resulting polymer must be separated from the solvent after polymerization. Therefore, equipment and energy for the separation are further required, and in some cases, equipment for purifying the solvent must be furthermore provided.

When the fluidized bed type reactor is used as the polymerization reactor, the polymerization is carried out while solids (catalyst, resulting polymer) are fluidized by means of a gas medium to form a fluidized bed. Therefore, removal of the medium is usually unnecessary, and polymers can be produced at low costs. However, the gas linear velocity must be controlled to maintain the fluidized bed. Besides, in such polymerization that the quantity of reaction heat is large, the heat exchange quantity sometimes restricts the polymerization, or in such polymerization that the resulting polymer has a low melting point, formation of a fluidized bed occasionally becomes impossible. Thus, the operating conditions are frequently restricted.

In the use of the vessel type reactor or the fluidized bed type reactor, it is difficult to add raw materials at a suitable position of the reactor depending on the progress of the polymerization so as to control properties of the resulting polymer. Therefore, plural reactors are usually employed to obtain polymers of desired properties.

Polymerization reactions using a tubular reactor as the polymerization reactor are also known, for example, a high-pressure polymerization reaction (e.g., for producing high-pressure polyethylene) in which a monomer gas compressed under an elevated pressure to a supercritical fluid is fed to the tubular reactor (reaction tube) where the reaction takes place in a substantially homogeneous liquid phase system, and a homogeneous or slurry polymerization reaction using a liquid medium. It is also known that the tubular reactor is used as an apparatus for controlling the properties of the resulting polymer after the vessel type reactor or the fluidized bed type reactor.

In the conventional polymerization processes using a tubular reactor, however, the viscosity (or concentration) of the polymer liquid which can be transported (carried) in the reaction tube tends to be restricted by the capacity of a circulating pump or the like, so that it is difficult to obtain a high-viscosity (high-concentration) polymer liquid.

In order to conduct the high-pressure reaction by introducing a supercritical fluid of a high-pressure monomer into the tubular reactor as described above, various apparatuses, such as a huge and expensive compression apparatus to compress the monomer, an apparatus to keep the high pressure and a safety apparatus, are necessary. Further, the reaction using the supercritical fluid (liquid) is often carried out at relatively low temperatures, and thus the heat of reaction is hardly removed in spite of a wide heat-transfer area of the reactor.

In the liquid phase polymerization process, further, the resulting polymer must be separated from the solvent after the polymerization as described above.

In view of the foregoing conventional techniques, the present inventor has studied polymerization apparatuses and polymerization processes which can perform polymerization with excellent thermal efficiency and small power energy, which can produce various polymers with reduced restrictions on their properties such as viscosities and melting points, and which can simplify the procedure of removing a solvent from the resulting polymer after the polymerization. As a result, the present inventor has found that the above conditions can be satisfied with a polymerization process using a separated flow, which comprises feeding a monomer as a raw material, a polymerization catalyst, and optionally, an inert medium to a tubular reactor in a pressurized state; permitting a part of the raw material monomer and the inert medium fed to the reactor to form a gas phase and the remainder to form a liquid phase, so that both of the gas phase and the liquid phase are present in the reactor, wherein said liquid phase may contain a solid, such that a gas-liquid separated flow or a gas-liquid-solid separated flow has the gas phase that is continuous in the direction of flow is formed in the reactor; and polymerizing the raw material monomer while carrying the liquid phase by the gas phase flow, wherein the ratio of a volume flow rate of the liquid phase to a volume flow rate of the gas phase at the outlet of the reactor is 0.00001 to 100,000. Based on the finding, the present invention has been achieved.

It is known that fluids of gas-liquid two phases or fluids of gas-solid-liquid three phases introduced into a tube form a separated flow, as described in literatures (e.g., Gas-Liquid Two Phase Flow Technique Handbook, "1. Flow Regime" ed. by The Japan Society Of Mechanical Engineers, 1989), but any polymerization reaction performed in a tube wherein the separated flow is formed is not known.

OBJECT OF THE INVENTION

It is an object of the present invention to provide a polymerization process which can be performed with excellent thermal efficiency and small energy requirements and which can produce polymers with reduced restrictions on their properties such as viscosities and melting points.

SUMMARY OF THE INVENTION

According to the present invention there is provided a polymerization process which comprises the steps of:

feeding a monomer as a raw material, a polymerization catalyst, and optionally, an inert medium to a tubular reactor in a pressurized state;

permitting a part of the raw material monomer and the inert medium fed to the reactor to form a gas phase and the remainder to form a liquid phase, so that both of the gas phase comprising the raw material monomer and/or the inert medium gas and the liquid phase comprising the raw material monomer and/or the inert medium are present in the reactor, wherein said liquid phase may contain a resulting polymer as a solid, and so that a gas-liquid separated flow or a gas-liquid-solid separated flow has the gas phase that is continuous in the direction of flow is formed in the reactor; and polymerizing the raw material monomer while carrying the liquid phase by the gas phase flow, wherein the ratio of a volume flow rate of the liquid phase to a volume flow rate of the gas phase at the outlet of the reactor is 0.00001 to 100,000.

The separated flow is specifically a stratified flow, a wavy flow, an annular flow or an annular mist flow. Of these, preferable is an annular flow or an annular mist flow.

The temperature in the tubular reactor can be easily controlled by providing a heat exchanger on the outer periphery of the reactor and passing a heat medium through the heat exchanger.

In the present invention, an olefin can be used as the raw material monomer.

When the olefin is polymerized in the invention, an olefin polymerization catalyst comprising a transition metal catalyst component selected from Group IVB of the periodic table and a cocatalyst component can be used. In particular, a prepolymerized catalyst in which an olefin is prepolymerized in an amount of 50 to 5,000 g per 1 g of the transition metal catalyst component is preferably used.

The transition metal catalyst component for the prepolymerization is generally supported on a particulate carrier compound, which is preferably $MgCl_2$ or $SiO_2$. The prepolymerized catalyst preferably has a particle diameter of not less than 10 μm.

When the transition metal catalyst component or the prepolymerized catalyst and the cocatalyst component are fed to the reactor, the cocatalyst component is preferably fed together with an inert solvent by previously mixing it with the inert solvent.

DETAILED DESCRIPTION OF THE INVENTION

The polymerization process according to the invention is described in detail hereinafter.

The meaning of the term "polymerization" used herein is not limited to "homopolymerization" but may encompass "copolymerization". Also, the meaning of the term "polymer" used herein is not limited to "homopolymer" but may encompass "copolymer".

Figure 1:
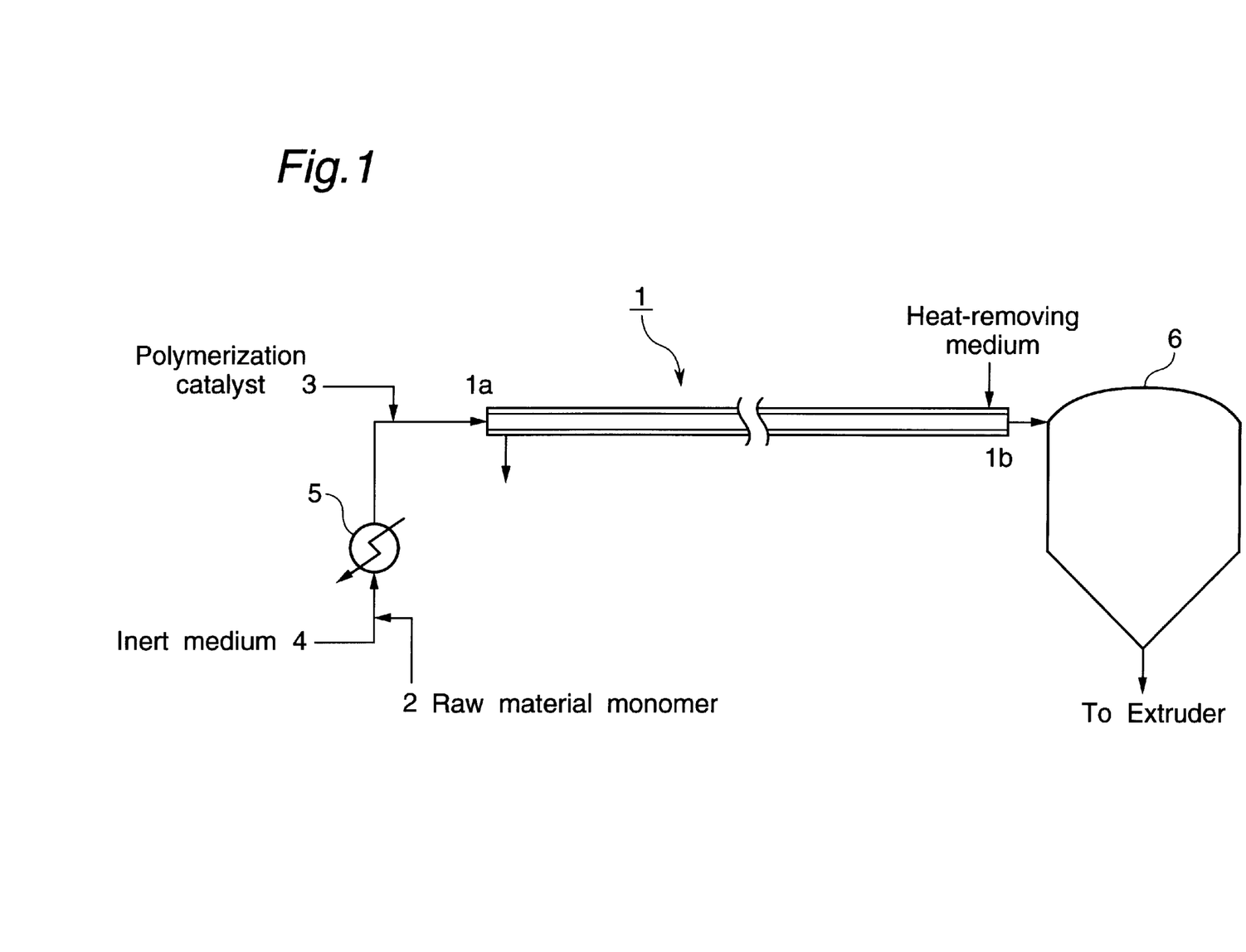
FIG. 1 schematically shows an embodiment of the polymerization process according to the present invention.

FIG. 1 schematically shows the polymerization process according to the present invention.

The polymerization process of the invention comprises the steps of:

feeding a monomer as a raw material, a polymerization catalyst, and optionally, an inert medium to a tubular reactor in a pressurized state;

permitting a part of the raw material monomer and the inert medium fed to the reactor to form a gas phase and the remainder to form a liquid phase, so that both of the gas phase comprising the raw material monomer and/or the inert medium and the liquid phase comprising the raw material monomer and/or the inert medium are present in the reactor, wherein said liquid phase may contain a resulting polymer as a solid, and so that a gas-liquid separated flow or a gas-liquid-solid separated flow has the gas phase that is continuous in the direction of flow is formed in the reactor; and polymerizing the raw material monomer, while carrying the liquid phase by the gas phase flow, wherein the ratio of a volume flow rate of the liquid phase to a volume flow rate of the gas phase (liquid phase volume flow rate/gas phase volume flow rate) at the outlet of the reactor is 0.00001 to 100,000.

First, the separated flow is described in detail.

The term "separated flow" used herein means a flow which is composed of gas-liquid phases, gas-solid phases or gas-liquid-solid phases in a tubular reactor and has a gas phase flow that is substantially continuous in the direction of flow. Each of the liquid phase, the solid phase and the solid-liquid phases may form a continuous flow or a discontinuous flow.

In the present invention, a gas-liquid separated flow or a gas-liquid-solid separated flow is preferable.

Examples of the separated flows include a stratified flow, a wavy flow, an annular flow and an annular mist flow.

Figure 2:
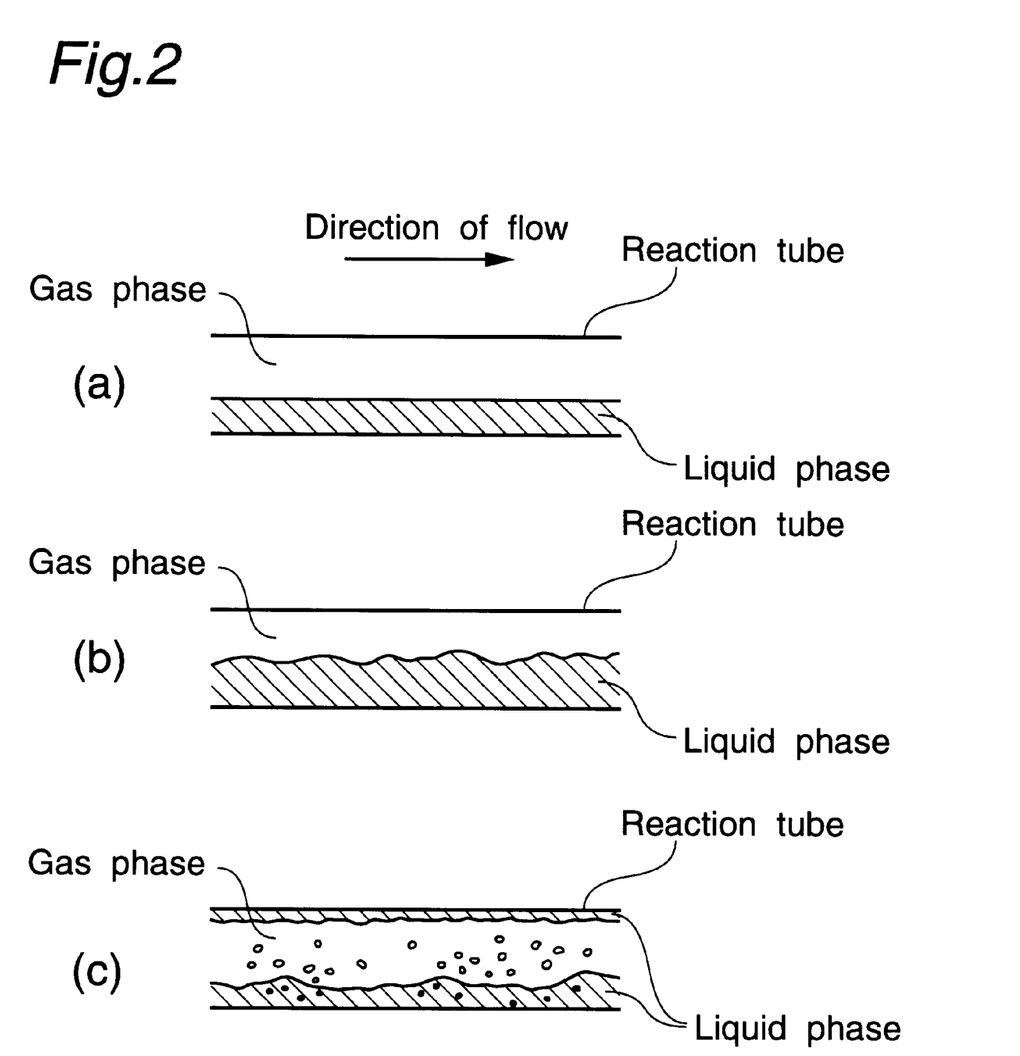
FIG. 2 shows flow patterns of a gas-liquid separated flow formed in the tubular reactor in the present invention.

The gas-liquid separated flow is now described with reference to the attached drawings. The stratified flow is a flow formed when a liquid phase flows on the bottom side of a horizontal tube (pipe) and a gas phase flows on the upper side of the tube due to the gravitational effect, and has an almost smooth interface between the gas phase and the liquid phase, as shown in FIG. 2(a). The wavy flow is a flow formed when the flow velocity of the gas phase of the stratified flow is increased, and has a wavy interface between the gas phase and the liquid phase, as shown in FIG. 2(b). The annular flow is a flow wherein a film of a liquid phase is present along the wall of the tube and a gas phase is formed at the center (core) of a section of the tube. The annular mist flow is a flow wherein the gas phase of the annular flow contains droplets, as shown in FIG. 2(c).

Of the above flows, the annular flow or the annular mist flow is particularly preferably formed in the invention.

Definition of the flow patterns is described in detail, for example, in Gas-Liquid Two Phase Flow Technique Handbook, "1. Flow Regime" (ed. by The Japan Society Of Mechanical Engineers, 1989).

Together with the raw material monomer 2 and the polymerization catalyst 3, an inert medium 4 can be fed to the reactor 1. Any of known inert compounds can be widely used as the inert media, with the proviso that they have no adverse influence on the polymerization. For example, saturated hydrocarbons of 1 to 20 carbon atoms are employable. Specifically, there can be mentioned aliphatic hydrocarbons, such as methane, ethane, propane, butane, pentane, hexane, heptane, octane, decane, dodecane and tetradecane; and alicyclic hydrocarbons, such as cyclopentane, methylcyclopentane, cyclohexane, methylcyclohexane, cyclooctane and cyclohexane.

Inert gases, such as nitrogen, argon and helium, are also employable as the inert media.

In the present invention, the raw material monomer and if desired the inert medium are heated by, for example, a heater 5, and fed to the reactor 1 in the pressurized state. The pressure at the inlet of the reactor is in the range of usually atmospheric pressure to 100 kg/cm². F, preferably 5 to 50 kg/cm². F. The monomer and the inert medium at the inlet 1a of the reactor need only be in the pressurized state, i.e., have a higher pressure, relative to the pressure in the inside, particularly at the outlet 1b, of the reactor. Thus, for example, the pressure of the raw material monomer and the inert medium fed to the reactor may be atmospheric pressure at the inlet, if the pressure at the outlet of the reactor is reduced pressure.

In the reactor, a part of the raw material monomer and the inert medium fed thereto is made to be in a gas phase and the remainder is made to be in a liquid phase, whereby both of the gas phase and the liquid phase are present in the reactor.

Of various raw material monomers and inert media which can be fed to the reactor, those having, at atmospheric pressure, a boiling point of not higher than 200° C., preferably not higher than 150° C., particularly preferably not higher than 100° C., can form a gas phase in the reactor.

Examples of the inert media capable of being in a gas phase in the reactor include inert gases, such as nitrogen, and saturated hydrocarbons of 1 to 20 carbon atoms, preferably saturated hydrocarbons of 3 to 10 carbon atoms, from among the aforesaid saturated hydrocarbons.

The gas phase may be formed from only the raw material monomer gas or only the inert gas, or from a mixed gas thereof.

The gas phase may also contain two or more raw material monomer gases, or two or more inert gases. Further, other gaseous ingredients, such as hydrogen as a molecular weight modifier, may be contained in the gas phase.

The liquid phase comprises the residual monomer and/or the residual inert medium which do not form the gas phase in the reactor.

Of various raw material monomers and inert media, those having a boiling point at atmospheric pressure of not lower than −150° C., preferably not lower than −40° C., and not higher than 350° C. can be present in a liquid phase in the reactor.

Specifically, there can be mentioned saturated hydrocarbons of 1 to 20 carbon atoms, preferably saturated hydrocarbons of 3 to 10 carbon atoms, from among the aforesaid saturated hydrocarbons.

The liquid phase may contain two or more raw material monomers, or two or more inert solvents.

The liquid phase may further contain a resulting polymer as a solid (in the form of a slurry).

It is preferable that the raw material monomer and/or the inert medium capable of being in a liquid phase in the reactor is fed to the reactor in such an amount that the volume ratio of the raw material monomer and/or the inert medium capable of being in a liquid phase in the reactor to the raw material monomer and/or the inert medium capable of being in a gas phase in the reactor is in the range of 0.00001 to 100,000, preferably 0.001 to 10,000.

The catalyst may be fed in any of gas, liquid and solid states. The components of the catalyst and the manner to feed the catalyst are described later in detail.

In the present invention, the components fed to the reactor form the above-mentioned gas-liquid separated flow or gas-liquid-solid separated flow in the reactor, and polymerization of the raw material monomer is performed while the liquid phase or the solid-liquid phases in the reactor is carried by the gas phase (sometimes referred to as "carrier gas" hereinafter) consisting of the raw material monomer and/or the inert medium gas in the reactor.

When the raw material monomer, the catalyst and the inert medium are fed to the tubular reactor to form the separated flow as described above, it is desired that the gas linear velocity at the place in the reactor where the gas phase has the lowest gas linear velocity is in the range of usually 0.5 to 500 m/sec, preferably 1 to 300 m/sec, particularly preferably 3 to 150 m/sec.

The gas linear velocity is determined in the following manner. The gas flow rate (volume) at the outlet 1b of the reactor is subjected to temperature/pressure correction and gas-liquid equilibrium calculation to convert it to a gas flow rate (volume) in the reactor. Then, the gas flow rate calculated on the assumption that only the gas having this gas flow rate obtained is passed through the reactor is divided by the sectional area of the flow in the reactor, to obtain the gas linear velocity. The gas flow rate (volume) at the outlet 1b of the reactor can be determined by connecting the outlet 1b of the reactor to a gas-liquid separator and measuring a flow rate of the gas discharged from a gas discharge tube of the gas-liquid separator.

In the polymerization performed while the separated flow is formed as described above, the polymerization pressure is desired to be in the range of usually 0.1 to 1,000 kg/cm². F, preferably 1.1 to 100 kg/cm². F, more preferably 1.5 to 80 kg/cm². F, particularly preferably 1.7 to 50 kg/cm². F. The polymerization pressure is an average value of the pressure at the inlet 1a of the reactor and the pressure at the outlet 1b of the reactor.

The polymerization temperature is desired to be in the range of usually −50 to +300° C., preferably −20 to +250° C., particularly preferably 20 to 200° C.

The polymer produced is dissolved or suspended in the liquid phase and carried by the carrier gas.

The raw material monomer contained in the liquid phase in the reactor is consumed for the polymerization, and the inert medium contained therein is heated by heat of the polymerization, whereby a liquid phase composed of only the polymer may be formed at the outlet 1b of the reactor.

The liquid phase (polymer liquid) obtained at the outlet 1b of the reactor is generally separated into a polymer and a solvent by a polymer separator 6 such as a hopper, and the polymer is then fed to an extruder (not shown). The liquid phase (polymer liquid) at the outlet 1b of the reactor contains substantially no solvent or only an extremely small amount of a solvent, and therefore the polymer liquid can be fed directly to the extruder according to circumstances.

There is no specific limitation on the concentration of the produced polymer in the liquid phase. For example, the polymer concentration may be a high concentration, such as 100 to 35% by weight, preferably 90 to 40% by weight, or it may be lower than this concentration.

At the outlet 1b of the reactor, the liquid phase composed of only the polymer or composed of the solvent and the polymer dissolved or suspended in the solvent is obtained.

In the present invention, the ratio of a flow rate of the liquid phase to a flow rate of the gas phase (liquid phase flow rate/gas phase flow rate, by volume), namely, S/G ratio, at the outlet 1b of the reactor is in the range of 0.00001 to 100,000, preferably 0.00001 to 10,000, particularly preferably 0.00001 to 1,000.

The S/G ratio (volume flow rate ratio) can be determined in the following manner. The feed rates of the raw material monomer and the inert medium measured at the inlet 1a of the reactor by means of a flowmeter are subjected to temperature/pressure correction on the basis of the temperature and the pressure in the reactor using an equation of state such as van der Waals equation or virial equation and are subjected to gas-liquid equilibrium calculation using Roult's law or Redilich-Kister equation, to obtain a volume flow rate of the liquid phase and a volume flow rate of the gas phase in the reactor. To the volume flow rate of the liquid phase is added a volume flow rate of the polymer to obtain a value S. Using the value S and the gas phase volume flow rate G, the S/G ratio (volume flow rate ratio) can be calculated.

The S/G ratio at the outlet 1$b$ of the reactor may be a mass flow rate, and in this case, the S/G ratio is in the range of 0.00001 to 5,000, preferably 0.0001 to 500, particularly preferably 0.0001 to 50.

The S/G ratio (mass flow rate ratio) can be determined in the following manner. The feed rates of the raw material monomer and the inert medium measured at the inlet 1$a$ of the reactor by means of a flowmeter are subjected to temperature/pressure correction on the basis of the temperature and the pressure in the reactor using an equation of state such as van der Waals equation or virial equation and are subjected to gas-liquid equilibrium calculation using Roult's law or Redilich-Kister equation, to obtain a mass flow rate of the liquid phase and a mass flow rate of the gas phase in the reactor. To the mass flow rate of the liquid phase is added a mass flow rate of the polymer to obtain a value S. Using the value S and the gas phase mass flow rate G, the S/G ratio (mass flow rate ratio) can be calculated.

It is desirable that the pressure loss per unit length in the lengthwise direction of the reaction tube is usually not more than 5 kg/cm$^2$.m, preferably not more than 2 kg/cm$^2$.m, particularly preferably 1 kg/cm$^2$.m.

In the present invention, there is no specific limitation on the viscosity of the liquid phase obtained from the outlet 1$b$ of the reactor, and polymer liquids having viscosities over a wide range can be obtained. In general, a high-viscosity polymer liquid having a liquid phase viscosity (at the outlet temperature), as measured at the outlet 1$b$ of the reactor, of at most 1,000,000 poise, preferably 100,000 poise, particularly preferably 50,000 poise, can be obtained. The lower limit of the liquid phase viscosity is not particularly limited, and is usually not less than 1 cp, preferably not less than 10 cp.

More specifically, the liquid phase viscosity at the outlet 1$b$ of the reactor, namely, viscosity of the polymer substantially produced by the process of the invention, as measured under the conditions of a temperature of 230° C. and a shear rate of 10 sec$^{-1}$, is preferably in the range of $1\times10^2$ to $1\times10^6$ poise. A high viscosity of $3\times10^2$ to $1\times10^6$ poise is also preferable, or a viscosity of higher than $1\times10^3$ poise is available.

The viscosity can be determined by measuring a shear stress of a molten polymer by means of a capillary type flow property tester (manufactured by Toyo Seiki Seisakusho K.K.) and converting the shear stress to a viscosity. That is, a stress of a molten polymer extruded from a capillary is measured with varying the shear rate, and the measured stress is divided by the shear rate to obtain a viscosity.

According to the polymerization process of the invention wherein the separated flow is formed in the reactor and the liquid phase (or solid-liquid phases) is carried by the gas phase flow as a carrier gas, even if the liquid phase has a high polymer concentration and has a high viscosity, the high-viscosity liquid can be easily carried by the carrier gas in the reactor, and hence any other carrying means (power) than the carrier gas is not particularly necessary. Further, the present invention needs no stirring apparatus and is advantageous from the viewpoint of power energy.

The tubular reactor used in the polymerization process is not specifically limited on its sectional shape, size, etc., as far as the separated flow can be formed in the reactor. In general, the inner diameter of the reaction tube (pipe) is about 1 to 50 cm, and the length thereof is about 10 to 500 m. Two or more tubular reactors having different diameters may be connected to each other. The tubular reactor may be linear or may have a curved portion. The tubular reactor may be installed with slope, but it is usually installed horizontally.

The polymerization conducted in the tubular reactor has excellent energy efficiency, and the heat of reaction can be easily removed. Though the reactor can be cooled by only the spontaneous heat dissipation depending on the reaction, a heat exchanger may be provided on the outer periphery of the reactor. It is desirable that a heat medium is passed through the heat exchanger to remove heat of reaction or to heat the reaction system when the reaction needs removal of the reaction heat or needs heating of the system, respectively.

The heat exchanger is, for example, a jacket, and if necessary, it can be divided into plural parts and provided on the outer periphery of the tubular reactor so that the reaction temperature can be changed in any desired parts of the reaction tube.

To remove the heat of polymerization, the gas phase or the polymer liquid may be cooled by means of an external heat exchanger and then circulated in the reaction system.

In the present invention, a monomer feed opening can be appropriately provided at any optional position in the lengthwise direction of the reaction tube to feed copolymerizable monomers. If the monomers are fed to the reaction tube at such an position, polymers comprising various copolymerized components can be produced by a single reactor.

In the polymerization process of the invention, various polymerizable monomers can be reacted, and the raw material monomers and the catalysts can be used according to the desired polymers without specific limitation.

Examples of the raw material monomers used in the invention include olefins.

Specifically, straight-chain, branched or cyclic olefins of 2 to 20 carbon atoms, such as ethylene, propylene, 1-butene, 1-pentene, 1-hexene, 4-methyl-1-pentene, 1-octene, 1-decene, 1-dodecene, norbornene, tetracyclododecene and methyltetracyclododecene, can be homopolymerized or copolymerized in the olefin polymerization. The olefins may be copolymerized with non-conjugated dienes. Examples of the copolymerizable dienes include cyclic dienes, such as 5-ethylidene-2-norbornene, 5-propylidene-2-norbornene, dicyclopentadiene and 5-vinyl-2-norbornene; and chain non-conjugated dienes, such as 1,4-hexadiene, 5-methyl-1,5-heptadiene, 6-methyl-1,5-heptadiene, 6-methyl-1,7-octadiene and 7-methyl-1,6-octadiene.

The olefins may be copolymerized with aromatic vinyl monomers represented by CR$_2$=CR—Ph (each R is independently hydrogen or methyl, Ph is phenyl or p-alkyl-substituted phenyl, and they may have a halogen substituent), such as styrene.

In the present invention, the aromatic vinyl monomers such as styrene may be polymerized.

Any of catalysts generally used for polymerization are employable in the invention. In the polymerization of the above olefins, an olefin polymerization catalyst comprising, for example, a transition metal catalyst component and a cocatalyst component as described below is preferably employed.

The transition metal catalyst component used herein is a transition metal compound (A) containing a transition metal selected from Group IVB of the periodic table. The transition metal compound (A) may be represented by, for example, the following formula (i):

$$MLx \qquad (i)$$

wherein M is a transition metal selected from Zr, Ti, Hf, V, Nb, Ta and Cr; L is a ligand coordinating to the transition metal, specifically, a hydrogen atom, a halogen atom, an oxygen atom, a hydrocarbon group of 1 to 30 carbon atoms which may have a substituent, an alkoxy group, an aryloxy group, a trialkylsilyl group or a $SO_3R$ group (where R is a hydrocarbon group of 1 to 8 carbon atoms which may have a substituent such as halogen); and x is a valence of the transition metal.

Examples of the halogen atoms include fluorine, chlorine, bromine and iodine.

Examples of the hydrocarbon groups of 1 to 30 carbon atoms include alkyl groups, such as methyl, ethyl, propyl, isopropyl and butyl; cycloalkyl groups, such as cyclopentyl and cyclohexyl; aryl groups, such as phenyl, tolyl and cyclopentadienyl; and aralkyl groups, such as benzyl and neophyl.

These cycloalkyl groups, aryl groups and aralkyl groups may be substituted in part with halogen atoms, alkyl groups and trialkylsilyl groups.

When plural hydrocarbon groups selected from cycloalkyl groups, aryl groups and aralkyl groups are coordinated, they may be bonded through an alkylene group, such as ethylene or propylene, a substituted alkylene group, such as isopropylidene or diphenylmethylene, a silylene group, or a substituted silylene group, such as dimethylsilylene, diphenylsilylene or methylphenylsilylene.

Examples of the alkoxy groups include methoxy, ethoxy and butoxy. Examples of the aryloxy groups include phenoxy.

The transition metal compounds may be used singly or in combination of two or more. Further, they may be used after diluted with hydrocarbons or halogenated hydrocarbons.

The transition metal compound can be used in the form of a solid in the polymerization system. For example, the transition metal compound can be used together with a particulate carrier compound by contacting it with the carrier compound. Examples of the carrier compounds include inorganic compounds, such as $SiO_2$, $Al_2O_3$, $B_2O_3$, MgO, $ZrO_2$, CaO, $TiO_2$, ZnO, $Zn_2O$, $SnO_2$, BaO, $MgCl_2$ and NaCl; and resins, such as polyethylene, polypropylene, poly-1-butene, poly-4-methyl-1-pentene and a styrene/divinylbenzene copolymer. These carrier compounds can be used in combination of two or more kinds. The carrier compounds may be made particulate in the course of contacting them with the transition metal compound. Of the above carrier compounds, $MgCl_2$ and $SiO_2$ are particularly preferable.

The cocatalyst component for forming the olefin polymerization catalyst is a compound (B) selected from an organoaluminum compound, an organoaluminum halide compound, an aluminum halide compound, an organoboron compound, an organoboron oxy-compound, an organoboron halide compound, a boron halide compound and an organoaluminum oxy-compound.

These compounds (B), except the organoaluminum oxy-compound, may be represented by the following formula (ii):

$$BRx \qquad (ii)$$

wherein B is an aluminum atom or a boron atom, and x is a valence of the aluminum atom or the boron atom.

When the compound represented by the formula (ii) is an organoaluminum compound or an organoboron compound, R indicates an alkyl group of 1 to 30 carbon atoms.

When the compound represented by the formula (ii) is an aluminum halide compound or a boron halide compound, R indicates a halogen atom.

When the compound represented by the formula (ii) is an organoaluminum halide compound or an organoboron halide compound, R indicates both of an alkyl group of 1 to 30 carbon atoms and a halogen atom.

Examples of the halogen atoms include fluorine, chlorine, bromine and iodine. Examples of the alkyl groups of 1 to 30 carbon atoms include methyl, ethyl, propyl, isopropyl, butyl and isobutyl.

The organoaluminum oxy-compound may be represented by the following formula (iii) or (iv):

wherein R is a hydrocarbon group, such as methyl, ethyl, propyl or butyl, and m is an integer of not less than 2, preferably 5 to 40.

In the organoaluminum oxy-compounds (aluminoxanes) (iii) and (iv), the alkyloxyaluminum unit (OAl(R)) may consist of a unit of the formula $(OAl(R^1))$ wherein $R^1$ is the same group as defined for R, and a unit of the formula $(OAl(R^2))$ wherein $R^2$ is the same group as defined for R but is different from $R^1$, in combination.

Further, a part of the groups R in the alkyloxyaluminum units may be replaced by halogen, hydrogen, an alkoxy group, an aryloxy group or a hydroxyl group.

The cocatalyst compounds (B) mentioned above may be used singly or in combination of two or more. Further, they may be used after diluted with hydrocarbons or halogenated hydrocarbons.

Examples of the olefin polymerization catalysts comprising an appropriate combination of the transition metal compound catalyst component and the cocatalyst component include Ziegler catalysts, metallocene catalysts and vanadium catalysts.

The olefin polymerization catalyst may optionally contain an electron donor in addition to the transition metal catalyst component (A) and the cocatalyst component (B). Examples of the electron donors include ether compounds, carbonyl compounds and alkoxy compounds.

In the present invention, a prepolymerized catalyst obtained by prepolymerizing an olefin onto the above catalyst components can be employed. Specifically, a prepolymerized catalyst, in which an olefin is prepolymerized onto a catalyst comprising the transition metal catalyst component and the cocatalyst component, in an amount of 50 to 500 g, preferably 300 to 3,000 g, based on 1 g of the transition metal catalyst component, is preferably employed.

The transition metal catalyst component used for the prepolymerization is preferably supported on a particulate carrier compound as mentioned above. In the prepolymerization, an electron donor can be used if necessary.

Examples of the olefins to be prepolymerized include those as mentioned above for the raw material monomers used in the main polymerization. The olefin used in the prepolymerization may be the same or different from the olefin used in the main polymerization. Two or more olefins can be prepolymerized.

There is no specific limitation on the process for the prepolymerization, and various known prepolymerization processes can be widely adopted, as far as the olefin is prepolymerized in the above-mentioned amount.

For example, the prepolymerization can be carried out in such a state that the olefin becomes liquid, or in the presence of an inert solvent, or under the gas phase conditions. It is preferable that the olefin to be prepolymerized and the catalyst components are added to an inert solvent and the prepolymerization is carried out under relatively mild conditions. The prepolymerization conditions may be those under which the resulting prepolymer is dissolved or is not dissolved in the solvent. Preferred conditions are those under which the resulting prepolymer is not dissolved.

It is preferred to carry out the prepolymerization at a temperature of usually about −20 to +100° C., preferably about −20 to +80° C., more preferably −10 to +60° C.

The prepolymerization can be carried out by any of batchwise, semi-continuous and continuous processes.

The concentrations of the catalyst components in the prepolymerization vary depending upon the types of the catalyst components, but it is preferred to employ the transition metal catalyst component in a concentration, in terms of a transition metal atom, of usually about 0.001 to 5,000 mol, preferably about 0.01 to 1,000 mmol, particularly preferably 0.1 to 500 mmol based on 1 liter of the polymerization volume.

The cocatalyst component can be used in an amount of usually about 0.1 to 1,000 mol, preferably about 0.5 to 500 mol, particularly preferably 1 to 100 mol, based on 1 mol of the transition metal atom in the transition metal catalyst component.

In the prepolymerization, a molecular weight modifier such as hydrogen can be employed.

When the prepolymerized catalyst is obtained as a suspension, the suspension can be fed as it is to the reactor, or a prepolymerized catalyst can be separated from the suspension and fed to the reactor.

The prepolymerized catalyst preferably has a particle diameter of not less than 10 $\mu$m, more preferably 50 to 500 $\mu$m.

When the prepolymerized catalyst is used in the invention, the cocatalyst component can be fed to the reactor together with the prepolymerized catalyst. According to circumstances, however, the cocatalyst component does not need to be fed to the reactor.

In the present invention, polymerization of the raw material monomer is performed while carrying the liquid phase by the gas phase flow in the tubular reactor, as described above. When a catalyst containing the prepolymerized olefin in the above-mentioned amount is used in the polymerization, the catalyst fed to the reactor can exhibit excellent efficiency.

If the particle diameter of the catalyst is too small, the catalyst may sometimes undergo short-pass by the gas phase flow in the reactor, so that the ability of the catalyst may not be fully exhibited.

When the olefin polymerization catalyst comprising the transition metal catalyst component (or the prepolymerized catalyst) and the cocatalyst component is fed to the reactor, the cocatalyst component is preferably fed together with an inert solvent by previously mixing it with the inert solvent.

Examples of the inert solvents mixed with the cocatalyst component include the aforementioned inert solvents which are fed to the reactor. The solvent mixed with the cocatalyst is preferably the same solvent as fed to the reactor.

The premixing of the cocatalyst component with the inert solvent is made so that the cocatalyst and the inert solvent are uniformly mixed. Specifically, the premixing is carried out by adding the cocatalyst component to the inert solvent and stirring them at 5 to 60° C. for 0.5 to 24 hours. In the premixing, the inert solvent is preferably used in an amount of 250 to $2.5 \times 10^7$ ml based on 1 g of the cocatalyst component.

The premixing may be carried out batchwise or continuously.

If the cocatalyst component having been premixed with the inert solvent is fed to the reactor, the cocatalyst component can sufficiently be dispersed in the reaction system, and thereby the cocatalyst component fed to the reactor can be used effectively. Accordingly, the amount of the cocatalyst component fed to the rector is only the minimum amount (calculated value) necessary for the reaction.

Feeding of an excess amount of the cocatalyst component to the reactor may cause decrease of the activity of the transition metal catalyst component thereby to lower the polymerization activity based on the transition metal.

In the present invention, the molecular weight of the resulting polyolefin can be controlled by varying the polymerization conditions such as polymerization temperature or the amount of a molecular weight modifier (e.g., hydrogen) used.

When ethylene and an a-olefin of about 6 or more carbon atoms are copolymerized in accordance with the process of the invention, an ethylene/α-olefin elastomer having a wide molecular weight distribution can be prepared.

The polymerization process of the invention is particularly suitable for preparing a polymer having a density of 0.800 to 1.100 g/cm$^3$, preferably 0.820 to 1.080 g/cm$^3$, more preferably 0.830 to 1.050 g/cm$^3$.

The polymer obtained by the invention desirably has an elastic modulus of 1 to $1 \times 10^4$ MPa, preferably 2 to $5 \times 10^3$ MPa, more preferably 2 to $3 \times 10^3$ MPa.

The elastic modulus of the polymer is so-called flexural modulus, and is measured using a specimen having a thickness of 2 mm under the conditions of a span of 32 mm and a flexural rate of 5 mm/min in accordance with ASTM C790.

EFFECT OF THE INVENTION

According to the polymerization process of the invention wherein polymerization is performed while forming a gas-liquid separated flow or a gas-liquid-solid separated flow in the tubular reactor as described above, the polymerization can be accomplished with particularly excellent thermal efficiency. For example, even if a reaction with a large quantity of exothermic heat is conducted, the heat can be removed by means of only a jacket of the reactor.

Further, the separated flow has a gas phase that is continuous in the direction of flow in the reactor, and the gas phase flow carries a liquid phase. Therefore, even if the resulting polymer is dissolved in the liquid phase to give a high-viscosity solution, the solution can be carried by only the carrier gas in the reaction tube so that the reaction tube is hardly clogged. Thus, there is no need to provide any additional carrying means (power) such as a circulating pump and to stir the high-viscosity solution, and hence, the polymerization can be accomplished by small power energy.

Furthermore, since the liquid phase (polymer liquid) at the outlet 1b of the reactor does not substantially contain a solvent or contains only an extremely small amount of a solvent, equipment for drying the resulting polymer can be greatly simplified. In some cases, the polymer solution can be directly introduced into an extruder, and the procedure for recycling the solvent can be simplified.

According to the present invention, as described above, the polymerization can be accomplished by a simple tubular reactor without using any specific large-scale equipment, such as a large-sized stirring machine, a dryer and a high-pressure compression apparatus. That is, the polymerization can be accomplished at low costs of apparatuses. Besides, there are few restrictions on the viscosity and the melting point of the resulting polymer.

Moreover, the reaction temperature can easily be controlled in the lengthwise direction of the tube, and an additional comonomer can be fed at an optional position in the lengthwise direction of the reaction tube. Therefore, polymers having various properties can be prepared using a single tubular reactor.

EXAMPLE

The present invention is further described with reference to the following examples, but it should be construed that the invention is in no way limited to those examples.

In the examples, the S/G ratio (volume flow rate ratio) was determined in the following manner.

The gas-liquid equilibrium at the temperature and the pressure in the reactor was calculated using the known Redlich-Kister equation of state on the basis of the amounts and compositions of the materials (monomer, solvent, etc.) fed to the reactor, to obtain a volume flow rate of the liquid phase and a volume flow rate of the gas phase in the reactor.

To the volume flow rate of the liquid phase was added a volume flow rate of polyethylene discharged from the outlet 1$b$ of the reactor to obtain a value S, and the value S was divided by the volume flow rate G of the gas phase to obtain a S/G value.

The MI of polyethylene obtained in each example was measured at 190° C. under a load of 2.16 kg in accordance with ASTM D1238.

Example 1

To a tubular reactor (steel tube of ½B×40 m) were fed raw material monomers, i.e., ethylene and an α-olefin of 6 carbon atoms (4-methyl-1-pentene), a Ziegler type titanium prepolymerized catalyst (containing 2,000 g of prepolymerized ethylene per 1 g of a transition metal compound catalyst component), an alkylaluminum and n-decane, to copolymerize the raw material monomers under the following conditions.

Ethylene/α-olefin/n-decane: 83/11/6 (by mol)
Gas linear velocity (inlet of reactor): 30 m/sec
Reaction temperature: 170° C.
Reaction pressure: 16 kg/cm$^2$.F
S/G ratio (volume flow rate ratio): 1.3×10$^{-3}$
S/G ratio (mass flow rate ratio): 0.05
Concentration of liquid phase (polymer liquid) (outlet of reactor): 80% by weight
Viscosity of liquid phase (polymer liquid) (outlet of reactor): 1,000 poise In the above polymerization, a gas-liquid separated flow was formed in the reaction tube.

Through the above polymerization, high-quality polyethylene was obtained in an amount of 190,000 g per 1 g of the transition metal compound catalyst component in the prepolymerized catalyst and at a flow rate of 0.5 kg/hr at the outlet of the reactor.

The resulting polyethylene had a MI of 5 g/10 min and a density of 0.95 g/cm$^3$.

In the above polymerization process, the heat of reaction was able to be removed by jacket cooling only. Further, there was no need to use any other equipment than the reactor to remove the polymerization solvent from the resulting polyethylene.

Example 2

Polymerization was carried out in the same manner as in Example 1, except that the polymerization conditions were varied to the following conditions.

Ethylene/α-olefin/n-decane: 71/22/6 (by mol)
Gas linear velocity (inlet of reactor): 5 m/sec
Reaction temperature: 155° C.
Reaction pressure: 11 kg/cm$^2$.F
S/G ratio (volume flow rate ratio): 1.0×10$^{-4}$
S/G ratio (mass flow rate ratio): 0.005
Concentration of liquid phase (polymer liquid) (outlet of reactor): 80% by weight
Viscosity of liquid phase (polymer liquid) (outlet of reactor): 100 poise In the above polymerization, a gas-liquid separated flow was formed in the reaction tube.

Through the above polymerization, high-quality polyethylene was obtained in an amount of 400,000 g per 1 g of the transition metal compound catalyst component and at a flow rate of 0.1 kg/hr at the outlet of the reactor.

The resulting polyethylene had a MI of 35 g/10 min and a density of 0.89 g/cm$^3$.

In the above polymerization process, the heat of reaction was able to be removed by jacket cooling only. Further, there was no need to use any other equipment than the reactor to remove the polymerization solvent from the resulting polyethylene.

Example 3

To a tubular reactor (steel tube of ½B×25 m+⅝B×15 m) were fed a raw material monomer (ethylene), the same prepolymerized catalyst as used in Example 1, an alkylaluminum and n-decane, to polymerize the raw material monomer under the following conditions.

Ethylene/n-decane: 81/19 (by mol)
Gas linear velocity (inlet of reactor): 15 m/sec
Reaction temperature: 160° C.
Reaction pressure: 8 kg/cm$^2$.F
S/G ratio (volume flow rate ratio): 3.5×10$^{-5}$
S/G ratio (mass flow rate ratio): 0.0035
Concentration of liquid phase (polymer liquid) (outlet of reactor): 80% by weight
Viscosity of liquid phase (polymer liquid) (outlet of reactor): 500 poise In the above polymerization, a gas-liquid separated flow was formed in the reaction tube.

Through the above polymerization, polyethylene was obtained in an amount of 146,000 g per 1 g of the transition metal compound catalyst component at the outlet of the reactor.

The resulting polyethylene had a MI of 1.0 g/10 min and a density of 0.96 g/cm$^3$.

In the above polymerization process, the heat of reaction was able to be removed by jacket cooling only. Further, there was no need to use any other equipment than the reactor to remove the polymerization solvent from the resulting polyethylene.

Example 4

Polymerization of ethylene was carried out in the same manner as in Example 3, except that a premixture obtained by premixing an alkylaluminum and 90 ml of n-decane based on 1 mg of the alkylaluminum at room temperature for 1 hour (residence time) was fed to the reactor.

That is, the raw material monomer (ethylene), the same prepolymerized catalyst as used in Example 1 and the premixture of alkylaluminum and n-decane as obtained above were fed to a tubular reactor (steel tube of ½B×25 m+⅝B×15 m), to polymerize the raw material monomer under the following conditions.

Ethylene/n-decane: 81/19 (by mol)

Gas linear velocity (inlet of reactor): 15 m/sec

Reaction temperature: 160° C.

Reaction pressure: 8 kg/cm$^2$.F

S/G ratio (volume flow rate ratio): $3.5 \times 10^{-5}$

S/G ratio (mass flow rate ratio): 0.0035

Concentration of liquid phase (polymer liquid) (outlet of reactor): 80% by weight Viscosity of liquid phase (polymer liquid) (outlet of reactor): 500 poise In the above polymerization, a gas-liquid separated flow was formed in the reaction tube.

Through the above polymerization, high-quality polyethylene was obtained in an amount of 293,000 g per 1 g of the transition metal compound catalyst component and at a flow rate of 0.8 kg/hr at the outlet of the reactor.

The resulting polyethylene had a MI of 2 g/10 min and a density of 0.96 g/cm$^3$.

In the above polymerization process, the heat of reaction was able to be removed by jacket cooling only. Further, there was no need to use any other equipment than the reactor to remove the polymerization solvent from the resulting polyethylene.

Comparative Example 1

When polymerization was performed in a tubular reactor using a conventional liquid phase flow, the concentration of the polymer liquid had to be decreased to not more than 20% by weight to ensure good mixing of the polymerization system so as to maintain the product quality.

As a result, it was necessary to provide equipment for removing the polymerization solvent on the downstream of the reactor.

What is claimed is:

1. A polymerization process of olefins and/or conjugated dienes and/or vinyl aromatic compounds which comprises the steps of:

feeding a monomer as a raw material, a polymerization catalyst, and optionally, an inert medium to a tubular reactor from an inlet thereof in a pressurized state, said tubular reactor being linear and optionally having a curved portion;

permitting a part of the raw material monomer and the inert medium fed to the reactor and flowing to an outlet of the reactor to form a gas phase and the remainder to form a liquid phase, so that both of the gas phase comprising the raw material monomer and/or the inert medium and the liquid phase comprising the raw material monomer and/or the inert medium are present in the reactor, wherein said liquid phase may contain a resulting polymer as a solid, thereby to obtain a gas-liquid separated flow or a gas-liquid-solid separated flow which has the gas phase continuous in the direction of flow in the reactor; and polymerizing the raw material monomer while carrying the liquid phase by the gas phase flow, wherein the ratio of a volume flow rate of the liquid phase to a volume flow rate of the gas phase at the outlet of the reactor is 0.00001 to 100,000.

2. The polymerization process as claimed in claim 1, wherein the separated flow is a stratified flow, a wavy flow, an annular flow or an annular mist flow.

3. The polymerization process as claimed in claim 2, wherein the separated flow is an annular flow or an annular mist flow.

4. The polymerization process as claimed in any one of claims 1 to 3, wherein a heat exchanger is provided on the outer periphery of the tubular reactor and a heat medium is passed through the heat exchanger to heat or cool the reactor.

5. The polymerization process as claimed in claim 1, wherein a prepolymerized catalyst, which comprises a transition metal catalyst component selected from Group IVB of the periodic table and a cocatalyst component and in which an olefin is prepolymerized in an amount of 50 to 5,000 g per 1 g of the transition metal catalyst component, is used as the olefin polymerization catalyst.

6. The polymerization process as claimed in claim 5, wherein, when the prepolymerized catalyst and the cocatalyst component are fed to the reactor, the cocatalyst component is fed together with an inert solvent by previously mixing it with the inert solvent.

\* \* \* \* \*